United States Patent [19]

Jordan

[11] Patent Number: 5,576,257
[45] Date of Patent: Nov. 19, 1996

[54] ORGANOPHILIC CLAY WITH DUAL MODIFIERS, AND METHOD FOR ITS MANUFACTURE

[75] Inventor: Frank W. Jordan, Clarkston, Mich.

[73] Assignee: T.O.W. Inc., Clarkston, Mich.

[21] Appl. No.: 491,635

[22] Filed: Jun. 19, 1995

[51] Int. Cl.⁶ ........................................ C09C 1/42
[52] U.S. Cl. .................................... 502/62; 502/80
[58] Field of Search ................... 502/80, 85, 86, 502/62

[56] References Cited

U.S. PATENT DOCUMENTS

| | | | |
|---|---|---|---|
| 2,531,427 | 11/1950 | Hauser | 260/448 |
| 2,531,440 | 11/1950 | Jordan | 252/28 |
| 4,569,923 | 2/1986 | Knudson, Jr. et al. | 501/148 |
| 5,110,501 | 5/1992 | Knudson, Jr. et al. | 252/315.2 |
| 5,334,241 | 8/1994 | Jordan | 106/487 |

*Primary Examiner*—Michael Lewis
*Assistant Examiner*—Thomas G. Dunn, Jr.
*Attorney, Agent, or Firm*—Gifford, Krass, Groh, Sprinkle, Patmore, Anderson & Citkowski

[57] ABSTRACT

An organically modified clay comprises a smectite clay of the type having exchangeable, inorganic, cationic species therein, in which at least a portion of the inorganic cationic species have been substituted by a mixture of organic cations comprising $X_2R_2N^+$ and $XYR_2N^+$, wherein X is methyl, Y is benzyl and R is saturated alkyl. Also disclosed is a method for the fabrication of the modified clay.

19 Claims, No Drawings

ORGANOPHILIC CLAY WITH DUAL MODIFIERS, AND METHOD FOR ITS MANUFACTURE

BACKGROUND OF THE INVENTION

This invention relates generally to clays and more specifically to organically modified clays of the type used as thickeners and gelling agents. Most specifically the invention relates to a clay which has been modified with two different organic groups. The invention also relates to a method for the manufacture of the clay.

FIELD OF THE INVENTION

Certain colloidal clays will swell in water to many times their dry volume, and as such are of utility as gelling or thickening agents for control of the theological properties of a variety of materials. These naturally occurring clays are generally not compatible with a number of organic-based compositions. Hence, it is necessary to organically modify these clays to make them compatible with organic materials, and such clays are generally referred to as "organophilic" clays or "organo-clays". These clays have a large number of uses for thickening organic compositions such as paints, lubricants, cable filling compositions and the like.

The basic starting material used to make organophilic clay is an exchangeable clay of the smectite group and can include montmorillonite (commonly known and mined as bentonite), hectorite, saponite, attapulgite and sepolite. These clays include exchangeable cationic species such as sodium, potassium or calcium ions on their surface. In the course of manufacturing an organophilic clay, at least a portion of these exchangeable cationic species are substituted by an organic cation such as a quaternary amine, an organophosphorous ion or the like. In addition the organic group modifies the clay, making it compatible with organic compositions and in general allowing it to provide rheological modification in select organic fluids.

There is a large body of prior art relating to the manufacture of organophilic clays. For example, U.S. Pat. Nos. 2,531,427 and 2,531,440 both disclose general processes for the manufacture of organically substituted clays. U.S. Pat. No. 5,110,501 discloses a process for preparing organophilic clay in which the starting materials are reacted in a slurry under high shear. U.S. Pat. No. 5,334,241 discloses a low moisture, direct addition process for the fabrication of organophilic clays. U.S. Pat. No. 4,569,923 discloses yet another process for manufacturing organo-clays in which the clay is subjected to high energy pugmilling before reaction with the cation. In addition to processing parameters, the properties of an organo-clay will depend upon the nature of the organic cation used for modification, as well as upon the amount of the cation incorporated into the clay. Specific modifiers are utilized for particular mixtures.

It has been found that the amount of organic cationic material which is incorporated into the clay will depend upon the particular technique used for its incorporation. The clays of interest have a generally lamellar structure, and the structure must be opened to some degree in order to permit the cation exchange reaction to take place. At the same time, care must be taken to avoid destroying the lamellar microstructure of the clay. One group of substitution techniques involves processing the clay in a slurry form, in which instance, solvation relaxes the clay's structure in order to permit penetration of the organic cations. While such techniques are effective, it is generally preferable to avoid such highly dilute reaction conditions since forming the slurry involves a time and space consuming step. Furthermore, dewatering of the finished product is energy-intensive. For this reason, low moisture, direct addition techniques as described in U.S. Pat. No. 5,334,241, the disclosure of which is incorporated herein by reference, are advantageously employed in the preparation of modified clays.

The present invention is directed to an organically modified clay composition which includes a mixture of two specific organic cations. It has been found that this composition gives a product which exhibits superior performance in a wide variety of applications as compared to other modified clays. The material of the present invention may be fabricated by a variety of techniques, and it has been found that the dual cation material of the present invention, when fabricated by a low moisture, direct addition technique, manifests properties equivalent to, or better than, materials manufactured by the more energy-intensive slurry methods. These and other advantages of the present invention will be readily apparent by the drawings, discussion and description which follow.

BRIEF DESCRIPTION OF THE INVENTION

There is disclosed herein an organically modified clay which comprises a smectite clay having exchangeable inorganic cationic species therein, and in which at least a portion of the inorganic cationic species have been substituted by a mixture of organic cations which comprise: $X_2R_2N^+$ and $XYR_2N^+$ wherein X is methyl, Y is benzyl and R is a saturated alkyl.

In particular embodiments, the composition includes at least 5% of each organic cation, and one specific composition includes at least 25% of the $XYR_2N^+$ cation.

In one particular embodiment, the saturated alkyl comprises a 14 to 18 carbon alkyl derived from saturated tallow. In other embodiments, the clay may further include a dispersant material therein, which is typically present at 3–15% by weight.

The present invention is also directed to a method for fabricating the modified clay. In the method, the clay is reacted with a mixture of the two organic cations. In one embodiment, the reaction takes place under low moisture conditions, and the clay is mixed directly with the cations under high pressure conditions. In another embodiment, the clay is present in a slurry form and is mixed with the cations under high shear conditions.

DETAILED DESCRIPTION OF THE INVENTION

The present invention is directed to an organically modified clay. The clay is typically a smectite clay such as montmorillonite (commonly known and mined as bentonite), hectorite, saponite, attapulgite, sepiolite, and the like. The clay is modified with a mixture of organic cations, specifically quaternary, ammonium ions comprising: $X_2R_2N^+$ (the dimethyl quaternary compound) and $XYR_2N^+$ (the benzyl quaternary compound). In both of the foregoing, X is methyl, Y is benzyl, and R is a saturated alkyl. These cations are typically present together with their counteranions which are typically chloride, although other anions such as sulfate, nitrate, bromide, acetate and the like may be likewise present. The alkyl radical is most preferably a fully saturated alkyl, typically 10–20 carbons long. One particularly preferred group of alkyl radicals comprises fully saturated derivatives of tallow 14–18 carbons long.

The proportions of the two organic cations may vary over a fairly wide range; although, it is generally preferable that the mixture includes at least 5%, by weight, of each of the cations. One particularly preferred composition includes a clay in which the organic cations comprise, by weight, 25% of the benzyl quaternary compound and 75% of the dimethyl quaternary compound. Typically, the mixed quaternary compounds will comprise 10–60% of the dry weight modified clay, and the smectite clay itself will comprise 50–90% of the dry weight of the modified clay composition.

The organo-clay of the present invention will preferably include a dispersant material therein. The dispersing agent acts in a manner akin to a surfactant to optimize the thickening action of the organo-clay. A dispersing agent may comprise: a low molecular weight, polyhydroxylated compound such as pentaerythritol or neopentyl glycol, organic waxes such as hydrogenated castor oil, as well as mono- and polysulfonated materials such as sulfonated castor oil. The dispersing agent may also be a plasticizer, toluene sulfonamide, tri-alkoxyphosphate and similar compounds. Typically, the dispersant, if employed, will be present in the amount of 3–15% and more preferably 5–10%, by weight. In some instances the quantity of dispersant may be as little as a fractional percent or more than 20% by weight. Other ingredients such as coloring agents, fillers and the like may also be present.

The organically modified clays of the present invention have utility in a number of applications wherein it is necessary to thicken various organic-containing compositions. One particularly important application is in connection with the fabrication of paints wherein the thixotropic nature of the clay containing solutions prevents drips, runs and sags, and provides for good flow out and covering ability. Similarly, lubricants, cleaning compositions, cosmetics and the like may also advantageously include the clays of the present invention.

Experimental

In order to illustrate the advantages of the present invention, a series of modified clays were prepared in accord with the present invention. A comparative series of prior art modified clays were also prepared. The clays were incorporated into a paint base, and the resultant paint evaluated. As noted previously, the properties of an organo-clay will depend on factors including its composition as well as its processing conditions. In the following examples, each clay composition represents a material which has been optimized for best performance in paint compositions of this general type; therefore, comparisons have been carried out on an equal basis.

Comparative Example A: An organo-clay of the prior art was prepared utilizing bentonite clay and a dimethyl, dialkyl ammonium chloride quaternary compound in which the alkyl units were derived from fully saturated tallow (i.e., a dimethyl quaternary of the type used in the present invention). This material was prepared in accord with the direct addition, low moisture process method disclosed in U.S. Pat. No. 5,334,241. Specifically, 100 pounds of bentonite clay was processed together with 53.5 pounds quaternary amine. The quaternary compound was 75% active with the remainder comprising volatile solvents, primarily water and isopropyl alcohol. The composition also included 7 pounds of a dispersant agent comprising hydrogenated castor oil. The material was mixed under high-pressure, low-moisture conditions dried, cooled and milled to a powder of approximately 325 mesh. The procedure resulted in the preparation of approximately 143.5 pounds of organo-clay at a 3% moisture content.

Example B: A second composition was prepared according to the method of Example 1, except that the quaternary amines comprised a mixture of 25% of the benzyl material of the present invention and 75% of the dimethyl material of the present invention. The clay was fabricated by mixing 100 pounds of the bentonite clay with 55 pounds of the mixed quaternary amines ( approximately 75% active ) and 7 pounds of the hydrogenated castor oil dispersant. Processing was carried out in accordance with the methodology of Example A and resulted in a yield of 144.5 pounds of organo-clay at a 3% moisture content.

Comparative Example C: A material was prepared as in Example A, except that the quaternary amine compound comprised only the benzyl material of the present invention. The organo-clay was fabricated from 100 pounds of bentonite clay, 55 pounds of the quaternary compound (75% active) and 7 pounds of the aforementioned additive. The reaction yielded approximately 144.5 pounds of modified clay at a 3% water content.

Comparative Example D: This material comprised a commercially available, self dispersing and activating organo-clay sold by the Rheox Corporation under the name Bentone SD-1. This material is made using a traditional wet slurry process, and it is considered one of the leading organo-clays in the industry for thickening paint compositions.

Comparative Example E: This material comprised another commercially available, self dispersing and activating organo-clay sold by the United Catalyst Corporation under the designation "Tixogel EZ-100". This material is also manufactured by a wet processing method.

A series of paints were prepared using the above-described clays. Each paint included a base comprised of 45 grams $TiO_2$ pigment blended into 113 grams of alkyd resin (Reichold Type 12–102), 0.5 ml lecithin and 2.1 grams organo-clay. This mixture was ground for 10 minutes at approximately 15,000 rpm on a Hamilton Beach blender having a 0.875" diameter fluted rotor. After grinding, a solvent mix comprising 17 grams xylene and 37 grams VM and P was added, and the mixture blended in the same blender for 10 minutes at modest speed, just below vortex speed so as to avoid entraining air into the mix. In addition to the foregoing, a blank sample was prepared which included no organo-clay but all of the other ingredients of the paint.

After preparation, the test paints were allowed to stand overnight at room temperature and evaluated. The measured properties included the following:

Viscosity RVT Brookfield viscosities were measured at 5 and 50 spindle rpm utilizing a number 4 spindle and are summarized below.

Thixotropic index is calculated by dividing the 5 rpm viscosity measurement multiplied by 10, by the 50 rpm reading, and gives an index of the degree of thixotropy of the resultant paint. The index is a measure of the degree to which the composition manifests apparent high viscosity under low shear conditions and lower viscosity under high shear conditions. This property is desirable in a paint to allow for smooth brush out under shear conditions and quick set up to resist sag.

Anti-sag was measured to test resistance to sag, and is a functional property of the paint more important than viscosity itself. In this test, paint is drawn by a blade held against a piece of card stock, in such a manner that ribbons of paint are created by regularly spaced gaps in the bottom edge of the blade, each ribbon of paint being thicker than the next one by 1 mil. Following this draw-down, the card is immediately set vertical on its edge with the ribbons running horizontally, and the thinnest ribbon at the top. This allows those ribbons of paint that exceed the paint's anti-sag capability to run and drip into, and sometimes past, the adjacent larger ribbon. The anti-sag reading of 10, for instance, means that the ribbon that was drawn through the gap of 0.010 of an inch thickness did not run into the next thicker ribbon (0.011 of an inch).

Stormer viscosity is measured in Krebs units for compatibility with the more common viscosity measurement used in the paint industry.

The Hegman test is a measure of oversized particles in a paint composition. The test is run using a thin wedge cut into a steel plate. The wedge is 100 microns deep at one end and tapers to 0 at the other. A small quantity of paint is placed in the thick end of the wedge and is then drawn to and past the thin edge with a stiff blade. The Hegman reading is that depth of the wedge at which particles are seen to be thicker than the paint film and are recognized as dots in the film's surface. A Hegman value of 8 means that there are virtually no measurable particles, while a Hegman value of 4, for example, means that the largest particles are 50 microns in diameter. A Hegman value of 0 means that the paint includes particles the largest of which are 100 microns in diameter.

In order to minimize temperature dependent effects, all samples were tested at 75 degrees F., and the results of the test are summarized in Table 1 herein below.

TABLE 1

| Sample | Viscosity | | Thixotropic Index | Anti-Sag | Krebs | Hegman |
|--------|-----------|--------|-------------------|----------|-------|--------|
|        | 5 rpm     | 50 rpm |                   |          |       |        |
| A      | 3.5       | 25.3   | 1.38              | 9        | 71    | 7½     |
| B      | 4.9       | 33.6   | 1.46              | 12+      | 79    | 7½     |
| C      | 3.6       | 23.7   | 1.52              | 9        | 71    | 7½     |
| D      | 4.9       | 31.4   | 1.56              | 10       | 73    | 7½     |
| E      | 3.1       | 24.7   | 1.26              | 8        | 68    | 7      |
| Blank  | 1.2       | 11.9   | 1.01              | 7        | 65    | 7½     |

Example B represents the composition of the present invention and it is to be noted that even though its thixotropic index is slightly less than some of the comparative samples, the viscosity of the paint composition including the material of the present invention is as good as, or better than, any of the others. Most importantly, the anti-sag value, which is the best indicator of true performance in a paint is far better for the composition including the material of the present invention than for any of the comparative materials. It is notable that the material of Sample B includes a mixture of quaternary cations comprising the cations of Example A and those of Example C and the combination of the two provides results which surpass those obtained by either of the materials used singly. Also, the composition of the present invention equals or exceeds the best commercially available materials, which materials are made using a high-cost slurry process.

In addition to the aforedescribed performance criteria, the composition of the present invention is economically advantageous compared to the prior art compositions. The benzyl quaternary used in Example C, as a sole material, is relatively expensive compared to the dimethyl quaternary of Example A. The material of the present invention utilizes 25% of the higher priced benzyl quaternary together with 75% of the lower priced methyl quaternary, and performance achieved by the combination is generally better than that obtained through the use of the higher cost material alone; therefore, use of the mixed cations in the present invention is economically advantageous. In addition, it is to be noted that the material of the present invention was prepared in a low moisture, direct addition process, while the commercial materials of Examples D and E were prepared in a relatively high cost slurry process, and the material of the present invention performs at least as well as the higher cost commercial products. While the present invention may be practiced in combination with either a wet, or low moisture process for organo-clay manufacture it is particularly important that the invention permits the manufacture of high quality modified clays by a low cost process.

Organo-clays are frequently used as thickening agents for lubricating greases, and the present invention was evaluated in a second experimental series, in connection with the formulation of grease compositions. Evaluation was carried out utilizing the clays of Examples A, B, and C above. In addition, another clay, designated Example G, was evaluated. This clay comprised a commercially available product made by the traditional wet process described above in connection with Example D and included a dimethyl, dialkyl ammonium chloride quaternary. This product is commercially available under the designation Rheox Bentone 34. It differs from the Bentone SD-1 of Example D insofar as it does not have self dispersing properties incorporated thereinto. This material is considered to be one of the industry standards for use in lubricating greases.

The thickening agents were incorporated into greases in the following manner. Eight percent, by weight, of the organo-clay was mixed into lubricating oil (Exxon 150 Bright Stock). Mixing was carried out for 10 minutes, and acetone, in the amount of ⅓ the weight of the oil was added and mixing carried out for minute more. The blend was then run through a homogenizer at approximately 6,000 psi and emerged as a finished grease. The homogenizer functions on the principle of introducing shear by squeezing the fluid through an orifice held closed by a spring and cover. The shear energy was sufficient to disperse and activate the organo-clays.

The resultant greases were tested for consistency by utilizing a RVT Brookfield Helipath instrument. This instrument comprises a spindle, consisting of a thin shaft with an even thinner crossbar near the bottom. It is rotated and lowered into a test medium so as to continually contact fresh, undisturbed material. This instrument does not give an absolute reading, but provides a relative viscosity reading for series of materials. In this group of tests, Spindle D was employed and the results are summarized in Table 2 herein below.

TABLE 2

| Sample | Helipath Value |
|--------|----------------|
| A      | 27             |
| B      | 60             |
| C      | 23             |
| G      | 52             |

Again, the results show that the composition of the present invention, Example B, is significantly better than either of its components taken singly, or the industry preferred material used for the fabrication of lubricating greases.

While the performance of the compositions of the present invention had primarily been described with reference to their use as thickening agents for paints and greases, it is to be understood that they may be utilized in connection with other organic-based compositions such as inks, resins, cable filling compositions, cosmetics, cleaning compositions and the like. The proportions of the two cations may be varied over a wide range, although because of cost considerations, it is generally preferred that the benzyl quaternary be a minor component of the mixture. In general, each of the cations will comprise at least 5%, by weight, of the organic cations present. Most typically, the benzyl compound will comprise 5–50% of the organic cations with the methyl constituting the remainder. Typically, the benzyl material will be present in an amount of approximately 15–35%. The alkyl portions of the organic cation may vary depending upon the particular application. As noted previously, it is generally preferred that these groups comprise a 14–18 carbon chain which is fully saturated. Most typically these groups are obtained as derivatives of tallow.

In view of the foregoing, it is to be understood that the present invention may be practiced in numerous modifications and variations. The foregoing discussion, description and examples are merely meant to illustrate particular embodiments of the invention and are not meant to be limitations upon the practice thereof. It is the following claims, including all equivalents, which define the scope of the invention.

I claim:

1. An organically modified clay comprising: a smectite clay having exchangeable, inorganic cations therein, wherein at least a portion of said inorganic cations have been substituted by a mixture of organic cations comprising $X_2R_2N^+$ and $XYR_2N^+$, wherein X is methyl, Y is benzyl and R is a saturated alkyl.

2. A modified clay as in claim 1, wherein said mixture of organic cations includes at least 5% by weight, of each of said organic cations.

3. A modified clay as in claim 1, wherein said mixture of organic cations includes at least 25% by weight of said $XYR_2N^+$ cation.

4. A modified clay as in claim 1, wherein said saturated alkyl is of the formula: $C_nH_{2n+1}$ wherein n is 14 to 18.

5. A modified clay as in claim 1, further including dispersant material therein.

6. A modified clay as in claim 5, wherein said dispersant comprises, by weight, 3–15% of the clay.

7. A modified clay as in claim 5, wherein the dispersant is a material selected from the group consisting of: neopentyl glycol, pentaerythritol, hydrogenated castor oil, sulfonated castor oil, toluene sulfonamide, trialkoxy-phosphate, and combinations thereof.

8. A modified clay as in claim 1, wherein said clay comprises, on a dry weight basis, 10–60% of the said organic cationic species and 50–90% of said smectite clay.

9. A modified clay as in claim 1, wherein said smectite clay is selected from the group consisting of: montmorillonite, hectorite, saponite, attapulgite, sepiolite, and combinations thereof.

10. A modified clay as in claim 1, wherein said modified clay is of a particle size such that 100% of said particles pass through a 325 mesh screen.

11. A method of preparing an organically modified clay comprising the steps of:

providing a smectite clay having a number of exchangeable, inorganic cations therein;

providing a mixture including a first organic cation of the formula $X_2R_2N^+$, and a second organic cation of the formula $XYR_2N^+$, wherein X is methyl, Y is benzyl and R is saturated alkyl;

reacting said mixture with said clay so that at least a portion of the inorganic cations therein are replaced by the organic cations of said mixture.

12. A method as in claim 11, wherein the step of reacting said mixture with said clay comprises subjecting said clay and said mixture to a confining pressure of 3,000 to 8,000 pounds per square inch while mixing said clay and said mixture.

13. A method as in claim 12, wherein said clay is in a non-slurried form during the step of reacting.

14. A method as in claim 12 including the further step of pre-mixing said clay and said mixture before subjecting said clay to said confining pressure and mixing said clay.

15. A method as in claim 11, wherein the step of reacting said mixture comprises disposing said clay in a slurry and mixing said clay with said mixture under high shear conditions.

16. A method as in claim 11 including the step of grinding said clay to a particle size such that said clay passes through a 325 mesh screen, grinding step being carried out after the step of reacting said mixture with said clay.

17. A method as in claim 11, including the further step of adding a dispersant to said clay.

18. A method as in claim 11, wherein the step of providing a mixture including the organic cations comprises providing a mixture including at least 25% by weight of said second organic cation.

19. A method as in claim 11, wherein the step of providing said mixture of organic cations comprises providing a mixture such that the dry weight of the finished organically modified clay will comprise approximately 10–60% of said organic cations; and the step of providing the smectite clay comprises providing sufficient clay such that the dry weight of the organically modified clay will comprise approximately 50–90% of said smectite clay.

* * * * *